(12) United States Patent
Phillips et al.

(10) Patent No.: US 10,832,533 B2
(45) Date of Patent: Nov. 10, 2020

(54) RECEIPT PROCESSING AND ACCESS SERVICE

(71) Applicant: MasterCard International Incorporated, Purchase, NY (US)

(72) Inventors: Simon Phillips, York (GB); James J. Anderson, Mount Vernon, NY (US); Oran Cummins, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 241 days.

(21) Appl. No.: 14/808,261

(22) Filed: Jul. 24, 2015

(65) Prior Publication Data

US 2016/0117895 A1 Apr. 28, 2016

Related U.S. Application Data

(63) Continuation of application No. 13/287,698, filed on Nov. 2, 2011, now Pat. No. 9,123,033.

(51) Int. Cl.
*G07G 5/00* (2006.01)
*G06Q 20/40* (2012.01)
*G06Q 20/04* (2012.01)
*G06Q 20/32* (2012.01)

(52) U.S. Cl.
CPC .............. *G07G 5/00* (2013.01); *G06Q 20/047* (2020.05); *G06Q 20/327* (2013.01); *G06Q 20/401* (2013.01)

(58) Field of Classification Search
None
See application file for complete search history.

(56) References Cited

U.S. PATENT DOCUMENTS

| 2003/0212642 A1* | 11/2003 | Weller | G06Q 20/02 705/67 |
| 2005/0097049 A1* | 5/2005 | Writer | G06Q 20/00 705/44 |
| 2007/0069013 A1* | 3/2007 | Seifert | G06Q 20/0453 235/383 |

(Continued)

FOREIGN PATENT DOCUMENTS

GB 2473485 A 3/2011

OTHER PUBLICATIONS

Biallo & Team Gmbh: "Bank of Scotland Tagesgeld Efrahrungsberichte biallo", Apr. 25, 2010, retrieved from the internet, 13 pp.

(Continued)

*Primary Examiner* — Paul Danneman
(74) *Attorney, Agent, or Firm* — Buckley, Maschoff & Talwalkar LLP

(57) ABSTRACT

A method including receiving a query request for a registration status of a payment account number (PAN) with an electronic receipt service; determining, in reply to the query request, whether the PAN is registered with the electronic receipt service; determining an electronic receipt handling option associated with the PAN; and sending a response including at least an electronic receipt destination address, the electronic receipt destination address being an address to which an electronic receipt associated with the PAN of the query request is to be sent.

16 Claims, 5 Drawing Sheets

(56) References Cited

U.S. PATENT DOCUMENTS

2009/0271265 A1\* 10/2009 Lay ..................... G06Q 20/204
  705/14.38
2011/0145082 A1   6/2011 Hammad
2011/0145083 A1\* 6/2011 Rothschild ............ G06Q 40/02
  705/24

OTHER PUBLICATIONS

European Examination Report dated Jan. 8, 2016 issued by the European Patent Office for EP Application No. 12845375.0, 8 pp.

\* cited by examiner

RECEIPT PROCESSING AND ACCESS SERVICE

BACKGROUND

The use of credit card, debit cards, stored values cards, electronic wallets, and other means of payment relying on payment account numbers (PANs) as opposed to cash is ever-increasing among consumers. In some contexts, the proliferation of paperless payment transactions is becoming a preferred method of conducting many types of payment transactions, including small purchase amount transactions as well as larger purchases. The convenience of paperless payment transactions is attractive to many account holders.

However, account holders also like to have a receipt or record of their payments. Whether a consequence of habit or a need to comply with existing record keeping practices, paper receipts are still widely expected, if not desired, by many consumers. Yet, paper receipts are not as convenient and/or as efficient as other aspects of a paperless payment transaction using a PAN. In some instances, an otherwise quick and efficient purchase using a PAN may be slowed by the printing of a paper receipt. Additionally, the PAN user is provided with and must retain the physical copy of the purchase transaction. Integrating the paper receipt into other, most likely, electronic records requires greater effort on the PAN user's part.

The present inventors have now realized that it may be desirable to deliver efficient e-receipt provisioning.

DETAILED DESCRIPTION

In general, and for the purpose of introducing concepts of embodiments of the present invention, a payment account number herein may refer to an identifying string of numbers, an alpha-numeric string, and a non-numeric string associated with a source of funds account. The source of funds account may be associated with a credit card, a charge card, a debit card, a stored value card, a bank account, a savings account, a checking account, a money-market account, and other transactional accounts and demand deposit accounts. In some aspects, a financial institution may issue a credit, charge, or debit card. Such card issuers may authorize transactions on issued and outstanding cards, provide settlement services, and provide periodic, (e.g., monthly) activity statements to account holders.

Figure 1:
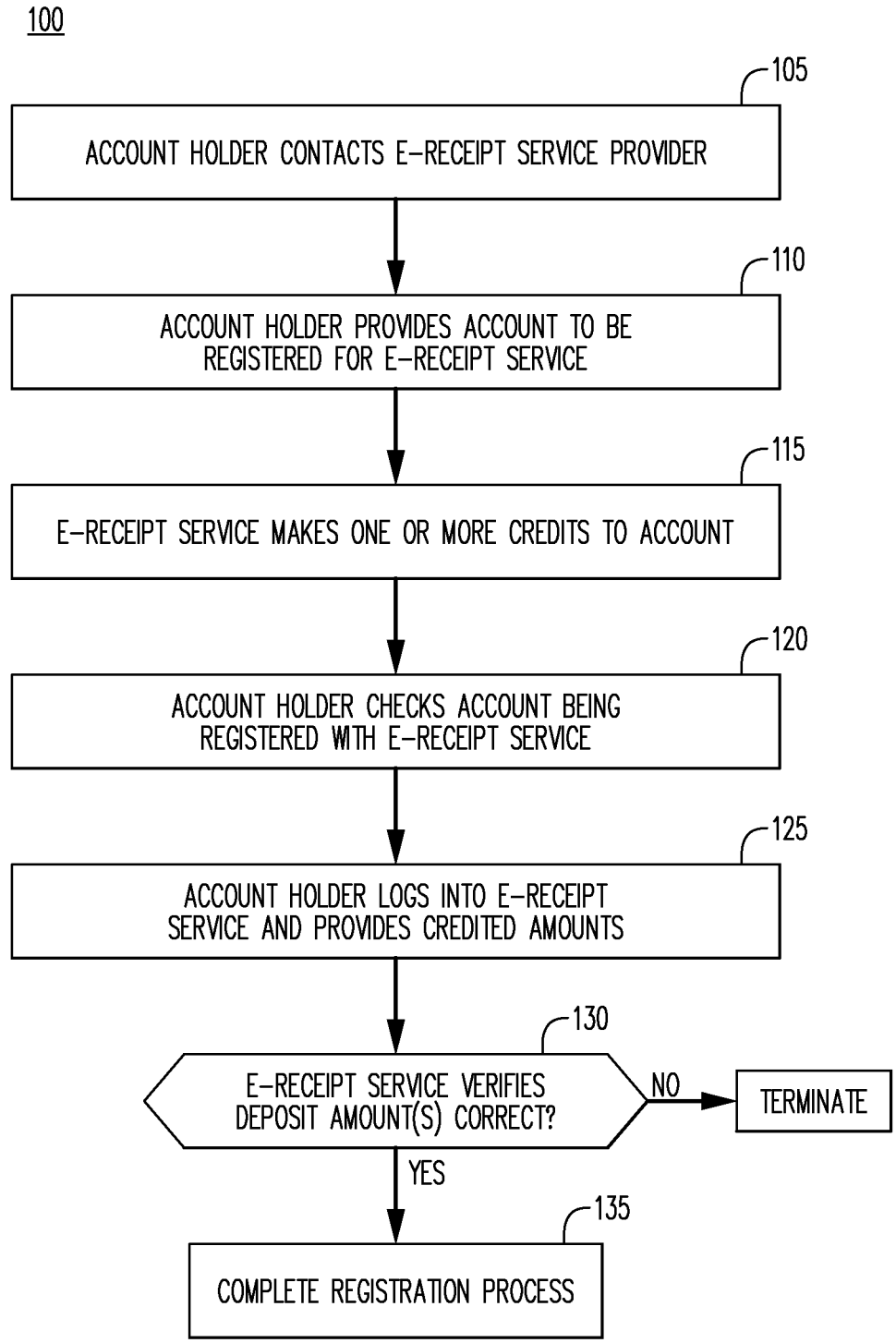
FIG. 1 is a flow diagram illustrating a process that may be performed in accordance with aspects of some embodiments herein.

FIG. 1 is an illustrative depiction of a flow diagram for a process 100, in accordance with some embodiments of the present disclosure. Process 100 may provide an example flow of operations for a payment account holder to register a payment account number (PAN) associated with a payment account with an electronic receipt (generally referred to herein as an "e-receipt service"). In some aspects, the e-receipt service may facilitate provisioning of an electronic record or receipt of a payment transaction. In some instances, the e-receipt may be delivered to the payment account holder as an electronic message. The electronic message may be in configured as, for example, an email message, a IM message, a text or SMS message, a MMS message, a social network message, and other types of electronic messages.

Referring to FIG. 1 at operation 105, the account holder may contact an e-receipt service provider. In some embodiments, the e-receipt service provider may be MasterCard International Incorporated, assignee of the present disclosure, or some other entity. The e-receipt service provider may be contacted via a personal computer or tablet for example during a web-based communication session, at a point of sale (e.g., a retail point of sale (POS) terminal, a mobile device running an on-demand POS application, etc.), or at a retail or branch location for the issuer of the PAN. In some embodiments, the account holder may provide the PAN to be registered with the e-receipt service to the e-receipt service provider at operation 110. In some aspects, the account holder may provide a name or other identifying indicia representative of the financial institution that issued the PAN. In some aspects, the identity of the issuer may be determined based on a format of the PAN. In some embodiments, the account holder may establish a username and password with the e-receipt service provider to facilitate a secure and traceable registration process 100, as well as to facilitate secure future communications with the e-receipt service provider using the username and password.

At operation 115, the e-receipt service provider may invoke an operation to authenticate the PAN and other information provided by the account holder. In some embodiments, the e-receipt service provider may authenticate the PAN by crediting the payment account associated with the PAN with an amount of funds only known by them. The amount of funds credited to the account may be a variable nominal amount, as determined and known by the e-receipt service provider. In some aspects, the credited amount may be, for example, less than one USD (e.g., $0.02 or the like). In some embodiments, more than one credit may be submitted to the issuer of the payment account by the e-receipt service provider. In embodiments including more than one credited amount to the payment account, each credited amount may be submitted as a discrete credit.

At operation 120, the account holder may access the payment account associated with the PAN to learn of the amount(s) of the one or more credits submitted by the e-receipt service provider. For example, the account holder may log into their account of the issuer associated with the PAN (e.g., a credit card account), using one of one or more access methods supported by the issuer. Upon gaining access to their payment account per the issuer's supported access methods and requirements, the account holder may review their payment account records for one or more credits from the e-receipt service provider to learn the exact amount of the credit(s).

At operation 125, the account holder may report the amount(s) of the payment account credit(s) to the e-receipt service provider. In some embodiments, the payment account holder may log into the e-receipt service provider to gain secure access the e-receipt service provider. In some aspects, the account holder may log into the e-receipt service provider's online presence using the username and password previously established at, for example, operation 110.

Continuing with process 100, the process flow proceeds to operation 130 where the e-receipt service provider verifies/determines whether the credit amount(s) submitted by the account holder to the e-receipt service provider match the credit amount(s) submitted to the issuer by the e-receipt service provider. If the e-receipt service provider amount(s) and the account holder amount(s) do not match, then the registration process 100 may terminate at 140. In the event the e-receipt service provider amount(s) and the account holder amount(s) do match, process 100 may proceed to operation 135 where the registration process may be continued.

In some embodiments, continuing the registration process at operation 135 may include obtaining personal or preference information from the account holder. For example, the account holder may submit an e-receipt destination address. The e-receipt destination address herein refers to the address to which an e-receipt is to be sent. In some embodiments, the e-receipt destination address may comprise more than one address or address type. In some aspects, each of the one or more e-receipt addresses may be used or selected as an operative destination address for an e-receipt based on one or more criteria. In some embodiments, the e-receipt destination address may be or include at least one of an email address, an IM address, a social network address, a public or private network address, etc.

In some embodiments, the e-receipt destination address may be verified by the e-receipt provider. For example, in some embodiments the account holder may be verified as the owner of the e-receipt destination address by confirming they have received a particular message (e.g., an email message including a test e-receipt related message) from the e-receipt service provider. By confirming they received the test message from the e-receipt service, the account holder may provide a measure of proof and assurance that they are the registered user of the payment account number, where the e-receipt destination address was provided during the PAN registration process.

In some embodiments, the e-receipt destination address may be verified by the e-receipt service provider before an e-receipt is sent to the account holder. In some aspects, the e-receipt destination address may be verified by the e-service provider at a time of registration, an update, or a change in terms of service of the e-receipt service.

Figure 2:
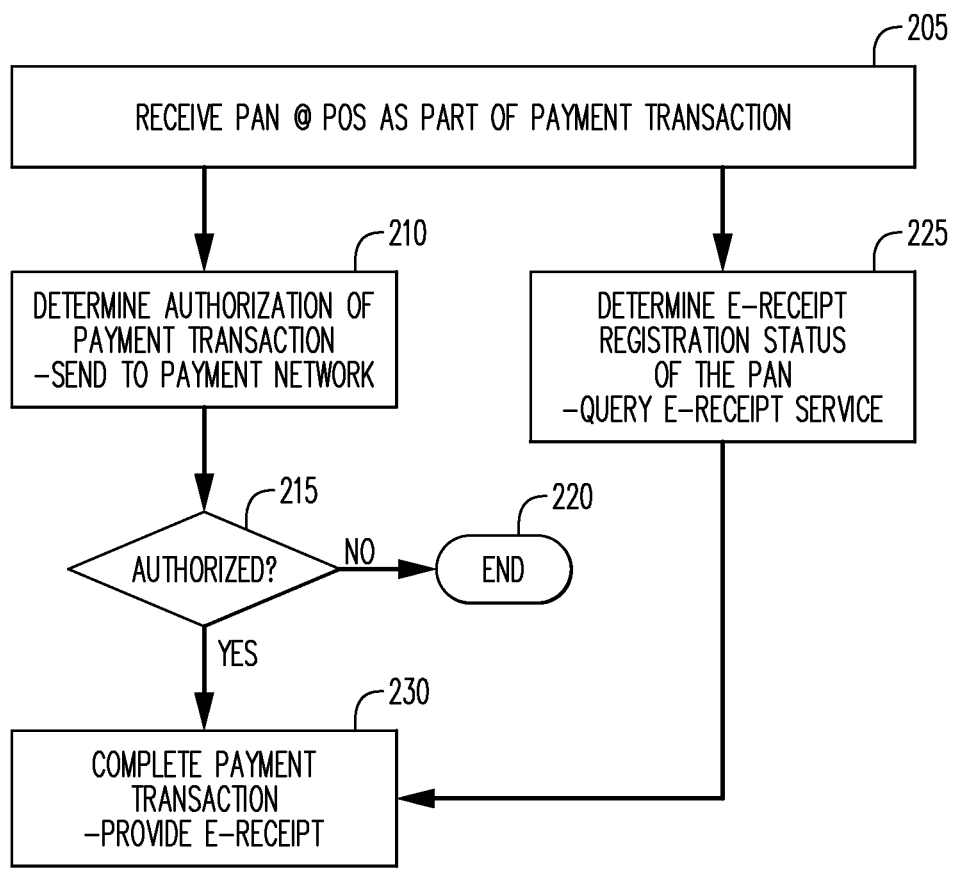
FIG. 2 is a flow diagram illustrating a process that may be performed in accordance with aspects of some embodiments herein.

FIG. 2 is a flow diagram illustrating a process 200 that may be performed in accordance with aspects of some embodiments herein. In some aspects, process 200 may include operations related to an authorization of a payment transaction involving a PAN and operations related to provisioning an e-receipt for the completed payment transaction using the PAN. At operation 205, a PAN is received as a means of payment for a payment transaction. The payment transaction may be conducted at a retail location, online with an online business merchant or shopping cart, between individuals using a smart phone, tablet, or other mobile application, and other types of transactions.

As illustrated in FIG. 2, an authorization for the payment transaction using the PAN may be determined starting at operation 210. In some embodiments, the authorization for the payment transaction may be conducted in a conventional manner with an exchange of information between a merchant acquirer financial institution, a payment network (e.g., the MasterCard Banknet network), and an issuer financial institution that issued the account associated with the PAN. In some embodiments, the authorization of the payment transaction of operation 210 may include operations and processes other than those of a conventional credit card and debit card purchase transaction, including future developed processes.

Continuing the authorization process at operation 215, a determination is made whether the payment is authorized. In the event the payment transaction is not authorized, the authorization operation of process 200 may terminate at operation 220. In the event that the payment transaction is authorized, then process 200 may proceed to operation 230 where the payment transaction may be completed.

In some embodiments, at substantially the same time, in parallel, or in conjunction with operations 210 and 215 are being performed in some instances, operation 225 may also be performed. Operation 225 may include determining an e-receipt registration status of the PAN received at operation 205 for payment of the payment transaction. The e-receipt registration status of the PAN may refer to whether the PAN is registered with an e-receipt service provider that facilitates the provisioning of an e-receipt for the payment transaction involving the PAN. Operation 225 may include one or more operations, the details of which will be discussed in greater detail below in connection with FIG. 4.

Regarding FIG. 2, an outcome of the determination of the e-receipt registration status of the PAN may be provided to a merchant or other entity before the completion of the payment transaction at operation 230. That is, the registration status of the PAN with an e-receipt service provider is forwarded to a merchant, merchant's agent, or equivalent before the payment transaction is completed. With respect to FIG. 2, a receipt record of the payment transaction is provided (if at all), whether a traditional physical receipt or an e-receipt, before or as part of the payment completion operation 230. Accordingly, the e-receipt registration status is provided to a merchant, merchant's agent, or other entity at an appropriate time such that an e-receipt may be provided, if at all, before the payment transaction is operationally concluded.

In some embodiments, the authorization determination of operation 210 and the e-receipt registration status determination operation 225 of FIG. 2 are determined substantially independent of each other. In some regards, operations 210 and 225 may be performed in any order relative to each other.

Figure 3:
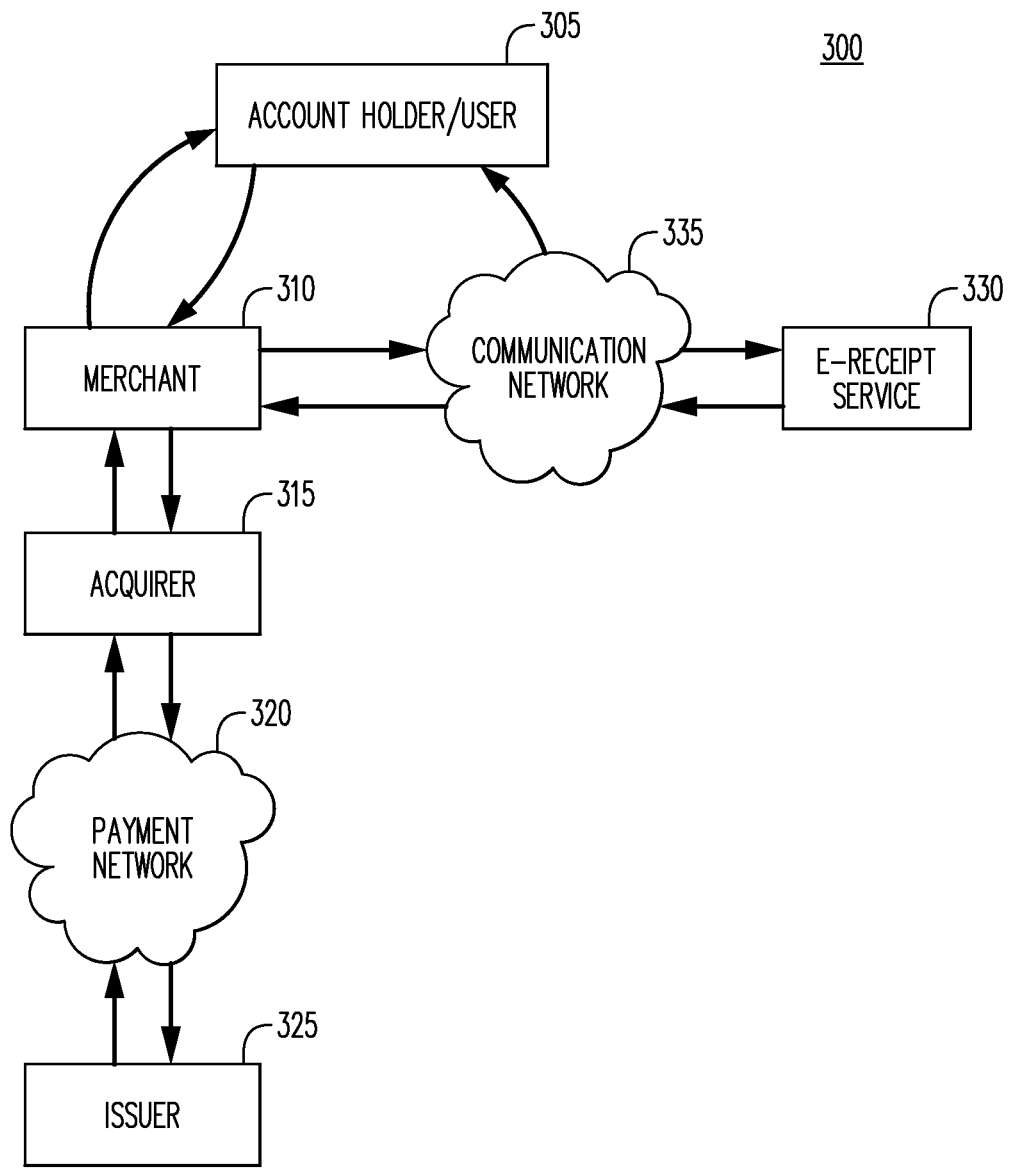
FIG. 3 is a schematic block diagram representation of a system, in accord with some aspects of some embodiments herein.

FIG. 3 is a block diagram of a system 300 that includes illustrative devices and systems that may be utilized for determining an authorization of a payment transaction using a PAN as a form of payment and for determining an e-receipt registration status of the PAN with an e-receipt service provider. In some embodiments, system 300 may be used to implement aspects of process 200, including operations 210 and 225. System 300 shows an account holder or PAN user at 305.

Account holder 305 may communicate with merchant 310 and e-receipt service provider 330, depending on the task or process they wish to undertake. For example, account holder 305 may interact with merchant 310 in an effort to conduct a payment transaction using a PAN as a means of payment. As in some other embodiments, the merchant may be a retail location, an online presence, a remittance processor, an individual, and other entities equipped to accept a PAN as a form of payment. In another example, account holder 305 may interact with e-receipt service provider 330 in an effort to register with the e-receipt service provider and/or update or change their registration status or profile with e-receipt service provider 330, including registering, changing, and updating one or more PANs with the e-receipt service provider.

In the some embodiments, authorization of a payment transaction using a PAN may be processed in a conventional manner, including exchanges of information related to the payment transaction between merchant 310, a merchant acquirer financial institution 315 or an agent thereof and an issuer financial issuer institution 325 or an agent thereof. As illustrated, communication between acquirer 310 and issuer 325 may be supported by payment network 320. Payment network 320 may include, in some embodiments, the Banknet payment network operated by MasterCard. Authorization and settlement of the payment transaction may be facilitated by payment network 320.

In the instance of account holder 305 interacting with e-receipt service provider 330 in an effort to, for example, register with the e-receipt service provider and/or update or change their registration status or profile with the e-receipt service provider, communication and exchanges of information may be transmitted via communication network 335. In some embodiments, communication network 335 may be a public network such as the Internet, while in other embodiments at least portions of network 335 may include a private network.

In some aspects, the communication and exchange of information from merchant 310 to account holder 305 may be accomplished via communication network 335. In some other instances, a communication from merchant 310 to account holder 305 may be accomplished via a direct wireless communication such as, for example NFC (near field communication) or RF (radio frequency) communication protocols. As an example of some communication exchanges herein, account holder 305 may communicate a PAN to be used in a payment transaction to a proximity reader POS device at merchant 310 via a NFC equipped smartphone or other computing device, whether portable and/or including mobile telephony functionality or otherwise. Upon receipt of the PAN, the merchant may commence an authorization process by requesting authorization of the payment transaction from issuer 325 via payment network 320. Simultaneously, merchant 310 may communicate a query regarding the registration status of the PAN with e-receipt service provider 330 via communication network 335. In the event the payment transaction is authorized and the PAN is registered with the e-receipt service such that an e-receipt is to be provided to the user of the PAN (account holder 305), merchant 310 may provide the e-receipt to account holder 305 via communication network 335 (e.g., the Internet). In some embodiments, the communication of the e-receipt may be facilitated by a wifi "hotspot" maintained by merchant 310 at or in the vicinity of their retail location(s).

Figure 4:
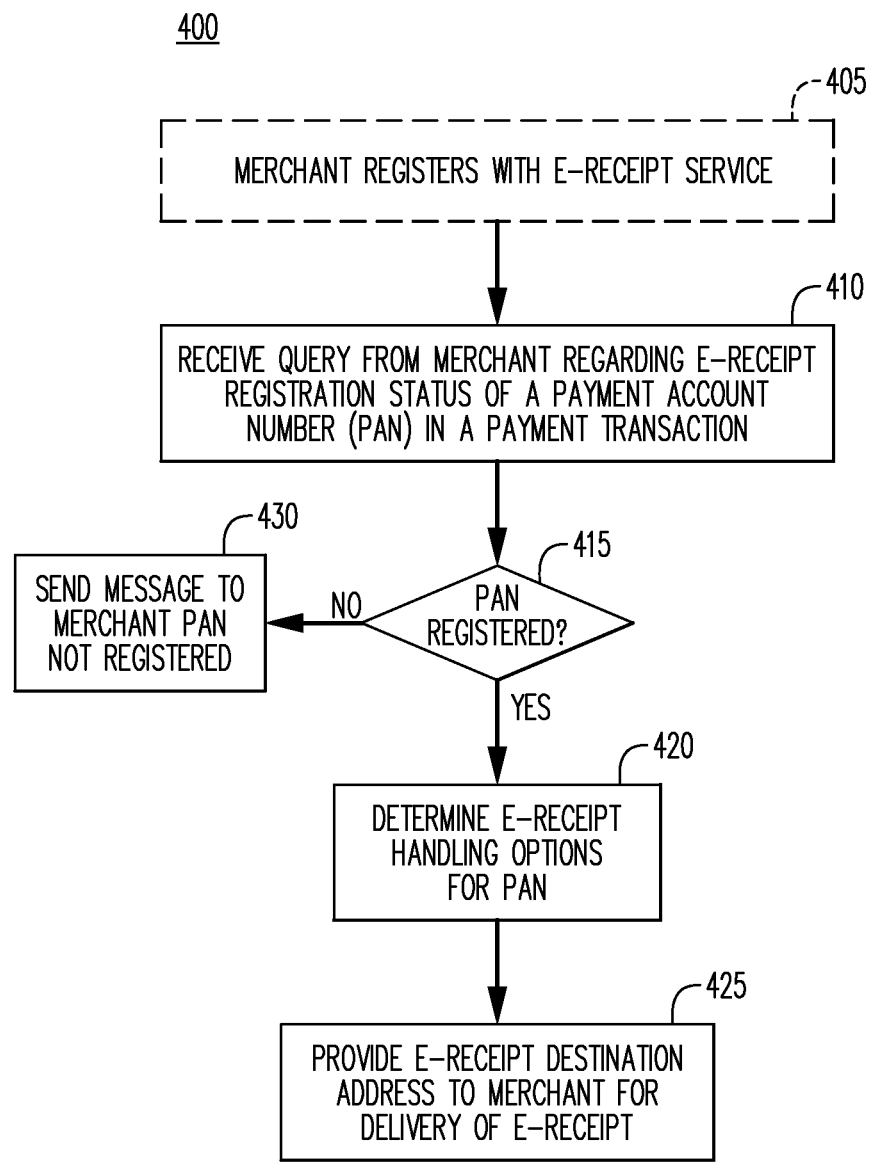
FIG. 4 is a yet another flow diagram chart illustrating a process that may be performed in accordance with an electronic receipt provisioning process, in accordance with aspects of some embodiments herein.

FIG. 4 provides an illustrative depiction of a process 400. In some aspects, process 400 includes operations for determining an e-receipt registration status of a PAN. In some embodiments, process 400 may be a detailed view of operation 225 introduced in FIG. 2. As discussed in connection with FIG. 2, the determination of the e-receipt registration status may be performed in response to a query from the merchant. Accordingly, operation 405 may include registering a merchant or other entity acting in a capacity of a merchant with respect to a payment transaction involving a PAN registered with an e-receipt service provider. The registration of the merchant may be provided based on a new or existing business relationship between the merchant and the e-receipt service provider or on an on-demand basis between the parties. In some embodiments of process 400, it may be assumed that the merchant is registered with the e-receipt service provider. To reflect such an assumption, operation 405 is shown in phantom in process 400.

At operation 410, the e-receipt service provider receives a query from the merchant regarding the e-receipt registration status of a PAN used in a payment transaction. In some embodiments, the query request may be generated by and received from a POS device or system. In some aspects, it is noted that the query request may be received from multiple merchants. That is, the services provided by the e-receipt service provider, including the registration of PANs and merchants with the e-receipt service provider, may be extended to multiple merchants. In this manner, the query received at operation 410 may be received from any one of multiple merchants registered with the e-receipt service provider without limitation to any specific merchant or financial institution. In some aspects, the multiple merchants may be distributed throughout a region, a country, or the globe.

In some embodiments, the query request may include a request asking whether the PAN submitted as a means of payment for a payment transaction is registered with the e-receipt service provided by the e-receipt service provider. The query may further request an e-receipt destination address for the PAN, in the instance the PAN is registered with the e-receipt service. In some instances, the query request may not include an explicit request for the e-receipt destination address, but the e-receipt destination address may automatically be provided in response to the query request in the instance the PAN is registered with the e-receipt service.

At operation 415, a determination is made whether the PAN is registered with the e-receipt service offered or supported by the e-receipt service provider. In the instance the PAN is not registered with the e-receipt service, the process may proceed to operation 430 where a reply message is sent to the merchant informing the merchant that the PAN is not registered with the e-receipt service. After sending the message that the PAN is not registered with the e-receipt service, process 400 may terminate.

In some embodiments, a determination that a PAN is not registered with an e-receipt service provider may present an opportunity to invite the PAN account holder to register the PAN with the e-receipt service. In some embodiments the account holder may be invited to register the PAN with the e-receipt service, either immediately or at a later date. Furthermore, the e-receipt service provider may make a determination to check whether the PAN is eligible to be associated with the e-receipt service. The eligibility requirements for the PAN may vary depending on industry standards and/or requirements of the e-receipt service provider. The invitation to register the PAN with the e-receipt service may be communicated to the PAN user by the merchant.

In the instance the PAN is registered with the e-receipt service as determined at operation 415, process 400 may determine one or more handling options for the PAN. The handling options may include rules governing how and when an e-receipt for a registered PAN is to be provided by a merchant or an entity acting on behalf of a merchant. The e-receipt handling options may include some required rules that are provided as part of the service offered by the e-receipt service provider. For example, the e-receipt service provider may require one or more fraud prevention safeguards be implemented for all e-receipts it supports. One example rule may include a rule that all e-receipt destination addresses are verified as belonging to the true owner of the account related to the PAN before they are provided to a merchant as a e-receipt destination address. Other rules may relate to criteria for when and how an e-receipt is to be provided. Examples related to some criteria may include a merchant identifier, a merchant category code (MCC), a purchase amount, a time/date limitation, a location constraint, and other parameters. Accordingly, the e-receipt option handling rules may control how and where the e-receipt, if any, is provided to the PAN account holder.

In some embodiments, an e-receipt may be provided to a particular one or more e-receipt destination addresses base on at least one of the merchant identifier, the MCC, the purchase amount, the time/date of the payment transaction, the location of the payment transaction constraint, and other parameters of the payment transaction. As an example, e-receipts may generally be provided for all payments greater than a pre-determined amount, not provided for payment transactions below a threshold amount, and provided at the account holder's discretion for payment transaction payment amounts therebetween. As another example, an e-receipt may be generated and sent to the account holder for some merchants and not others based on the merchant identifier, the MCC of the merchant, the time and/or date of the payment transaction, and the location of the payment transaction.

In some embodiments, the e-receipt handling options may be, at least in part, established or set based on user-defined preferences or a user profile. The account holder may provide an indication to the e-receipt service provider of the criteria and conditions that they would like to have considered in determining whether e-receipts are to be delivered to one or more e-receipt destination addresses. The PAN account holder may communicate their user preferences to the e-receipt service provider at a registration time or points in time thereafter.

Referring to FIG. 4 again, operation 425 may include providing an e-receipt destination address to the merchant. The merchant, upon reception of the e-receipt destination address, may send an e-receipt to the account holder at the e-receipt destination address. In some embodiments, the merchant also receives an indication of the e-receipt handling options from the e-receipt service in a message. The e-receipt handling options may be received in a message with the e-receipt destination address or a separate message from the e-receipt service provider. The merchant may provide the e-receipt in accordance with the received e-receipt handling options.

In some embodiments herein, the e-receipt destination address may include an address or identifier for various types of electronic communications. Accordingly, the e-receipt destination address may include at least one of an email address, a text message address, a mobile telephone number or other phone number that supports messages (e.g., text or voice), a mobile communication device identifier, an instant message address, a social network address identifier, and other electronic account user identifiers.

In some embodiments, the message(s) including the e-receipt destination address, and optionally the e-receipt handling options, may be in any format configuration acceptable and compatible with the merchants and e-receipt service providers discussed herein. As such, the messages may be communicated in accordance with all communication protocols employed by merchants and e-receipt service providers, including those now known and those that become known in the future.

In accord with processes herein, a PAN account holder may receive a message including a "link" to or an e-receipt (i.e., record) of a payment transaction. The e-receipt message may be automatically delivered to the account holder's email or other designated address as part of a payment transaction processing flow as discussed herein. In some embodiments, the e-receipt processing, including determining e-receipt registration status and delivery of the e-receipt may occur substantially simultaneously with a payment transaction authorization process such that the e-receipt may be sent to the account holder immediately upon the completion of the payment transaction. In some embodiments, the e-receipt processing may be accomplished in a periodic batch process, where the periods may be semi-daily, daily, nightly, weekly, and other durations of time.

Figure 5:
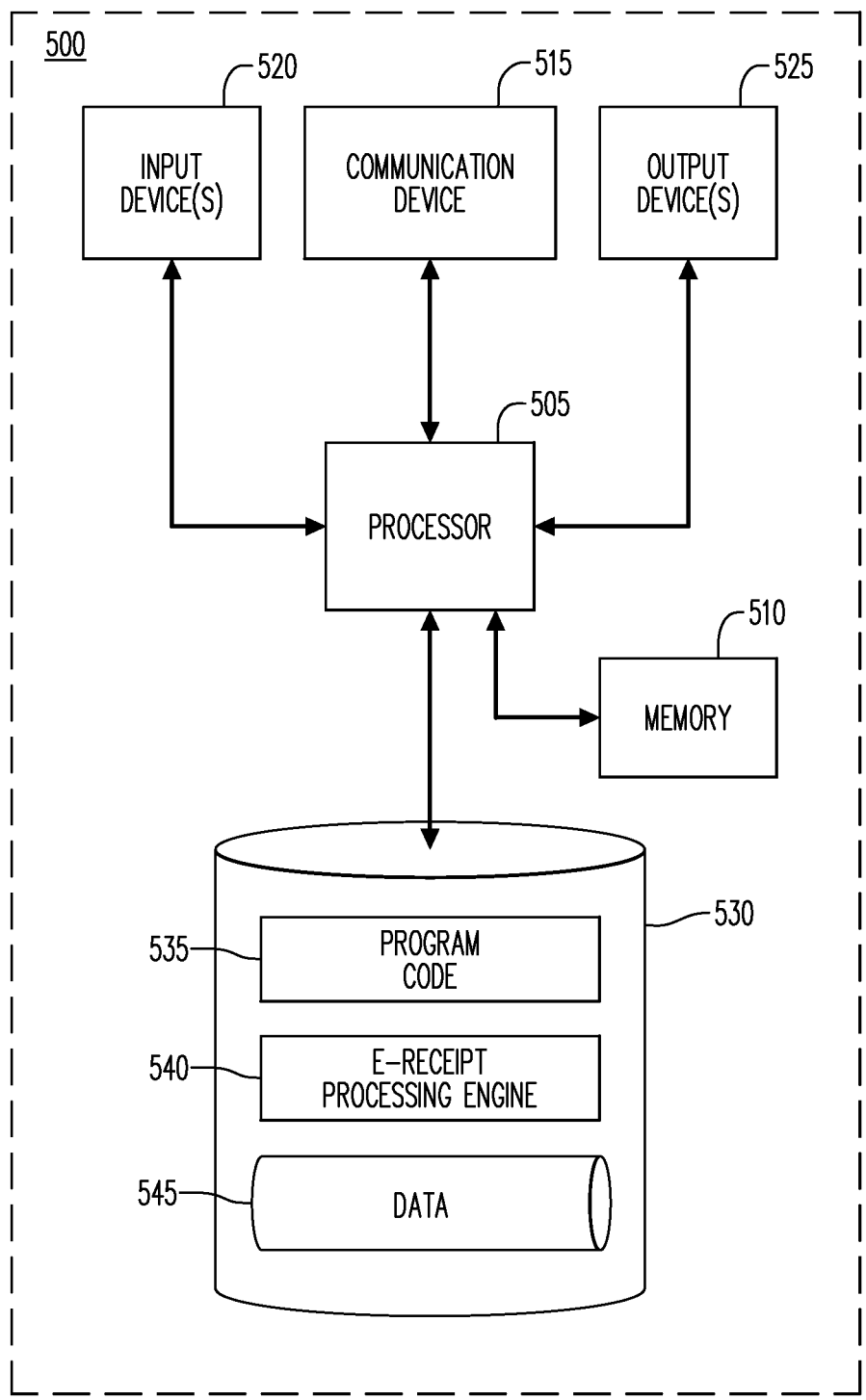
FIG. 5 illustrates a device, in accordance with some embodiments herein.

FIG. 5 is a block diagram overview of a system or apparatus 500 according to some embodiments. System 500 may be, for example, associated with any of the processes described herein, including for example a device or system to implement aspects of processes 200, 300, and 400. System 500 may include an application server supporting an e-receipt service. System 500 comprises a processor 505, such as one or more commercially available Central Processing Units (CPUs) in the form of one-chip microprocessors or a multi-core processor, coupled to a communication device 515 configured to communicate via a communication network (e.g., communication network 335) to another device or system. In the instance system 500 comprises an application server, communication device 515 may provide a means for system 500 to interface with a client device (e.g., a merchant POS device). System 500 may also include a local memory 510, such as RAM memory modules. The system 500 further includes an input device 520 (e.g., a touch screen, mouse and/or keyboard to enter content) and an output device 525 (e.g., a computer monitor to display a user interface element).

Processor 505 communicates with a storage device 530. Storage device 530 may comprise any appropriate information storage device, including combinations of magnetic storage devices (e.g., a hard disk drive), optical storage devices, and/or semiconductor memory devices. In some embodiments, storage device may comprise a database system.

Storage device 530 stores program code 535 that may provide computer executable instructions for processing requests from, for example, client devices in accordance with processes herein. Processor 505 may perform the instructions of the program 535 to thereby operate in accordance with any of the embodiments described herein. Program code 535 may be stored in a compressed, uncompiled and/or encrypted format. Program code 535 may furthermore include other program elements, such as an operating system, a database management system, and/or device drivers used by the processor 505 to interface with, for example, peripheral devices. Storage device 530 may also include data 545. Data 545 may be used by e-receipt processing engine 540 to execute operations related to the e-receipt processes disclosed herein. Data 545 may be used by system 500, in some aspects, in performing the processes herein, such as process 400. For example, a relational database table may be persisted or referenced by data 545 that includes a directory or other data structure containing records of PANs registered with the e-receipt service.

The above description and/or the accompanying drawings are not meant to imply a fixed order or sequence of steps for any process referred to herein; rather any process may be performed in any order that is practicable, including but not limited to simultaneous performance of steps indicated as sequential.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
receiving a query request from a merchant for a registration status of a payment account number (PAN) with an electronic receipt service, the PAN being used in a payment transaction with the merchant;
determining, in reply to the query request, whether the PAN is registered with the electronic receipt service;
in the event the PAN is registered with the electronic receipt service determining whether an electronic receipt is to be provided for the payment transaction, the determination made at least in part on information identifying at least one of the merchant and details associated with the payment transaction;
in the event it is determined that an electronic receipt is to be provided, determining an electronic receipt handling option identifying how and where the electronic receipt for the payment transaction is to be delivered; and
sending a response to the merchant, the response comprising an electronic receipt destination address, the electronic receipt destination address being an address to which the electronic receipt for the payment transaction is to be sent, the response sent based on, at least in part, the electronic receipt handling option associated with the PAN.

2. The method of claim 1, wherein the query request is received from a point of sale device.

3. The method of claim 1, wherein the query request includes a request for the electronic receipt destination address.

4. The method of claim 1, wherein the determination of whether to provide an electronic receipt for the transaction is based on at least one of criteria related to at least one of a merchant identifier, a merchant category code, a purchase amount, a time/date limitation, and a location of the payment.

5. The method of claim 1, wherein the query request and response thereto are communicated over a network other than a payment account network.

6. The method of claim 1, wherein the determining of whether the PAN is registered with the electronic receipt service determines the PAN is not registered with the electronic receipt service and further comprises:
determining the PAN is eligible to be associated with the electronic receipt service; and
extending an offer to a user of the PAN to register the PAN with the electronic receipt service.

7. The method of claim 1, wherein the electronic receipt destination address is at least one of an email address, a text message address, a mobile telephone number, a mobile communication device identifier, an instant message service address, and a social network address.

8. The method of claim 1, further comprising:
receiving an indication of a registration request to register a payment account number (PAN) with the electronic receipt service;
authenticating a payment account associated with the PAN via an issuer associated with the PAN;
receiving an electronic receipt destination address for the PAN; and
registering the PAN with the electronic receipt service by associating the authenticated PAN with the electronic receipt destination address.

9. The method of claim 8, further comprising validating the electronic receipt destination address for the PAN associated with the electronic receipt service prior to sending an electronic receipt to the electronic receipt destination address.

10. The method of claim 8, wherein the authenticating comprises:
sending at least one payment transaction amount to the payment account associated with the PAN and issuer; and
receiving a message from the user verifying the at least one payment transaction amount.

11. A non-tangible, computer-readable medium storing instructions, that, when executed by a processor, cause the processor to perform a method, the medium comprising:
instructions to receive a query request from a merchant for a registration status of a payment account number (PAN) with an electronic receipt service, the PAN being used in a payment transaction with the merchant;
instructions to determine, in reply to the query request, whether the PAN is registered with the electronic receipt service;
instructions to determine, in the event the PAN is registered with the electronic receipt service, whether an electronic receipt is to be provided for the payment transaction, the determination made at least in part on information identifying at least one of the merchant, and details associated with the payment transaction;
instructions to, in the event it is determined that an electronic receipt is to be provided, determine an electronic receipt handling option identifying how and where the electronic receipt for the payment transaction is to be delivered; and
instructions to send a response to the merchant, the response comprising an electronic receipt destination address, the electronic receipt destination address being an address to which the electronic receipt for the payment transaction is to be sent, the response sent based on, at least in part, the electronic receipt handling option associated with the PAN.

12. The medium of claim 11, wherein the query request includes a request for the electronic receipt destination address.

13. The medium of claim 11, wherein the determination of whether to provide an electronic receipt for the transaction is based on at least one of criteria related to at least one of a merchant identifier, a merchant category code, a purchase amount, a time/date limitation, and a location of the payment transaction.

14. The medium of claim 11, wherein the query request and response thereto are communicated over a network other than a payment account network.

15. The medium of claim 11, further comprising:
instructions to determine the PAN is eligible to be associated with the electronic receipt service; and
instructions to extend an offer to a user of the PAN to register the PAN with the electronic receipt service.

16. The medium of claim 11, wherein the electronic receipt destination address is at least one of an email address, a text message address, a mobile telephone number, a mobile communication device identifier, an instant message service address, and a social network address.

* * * * *